United States Patent Office 3,365,340
Patented Jan. 23, 1968

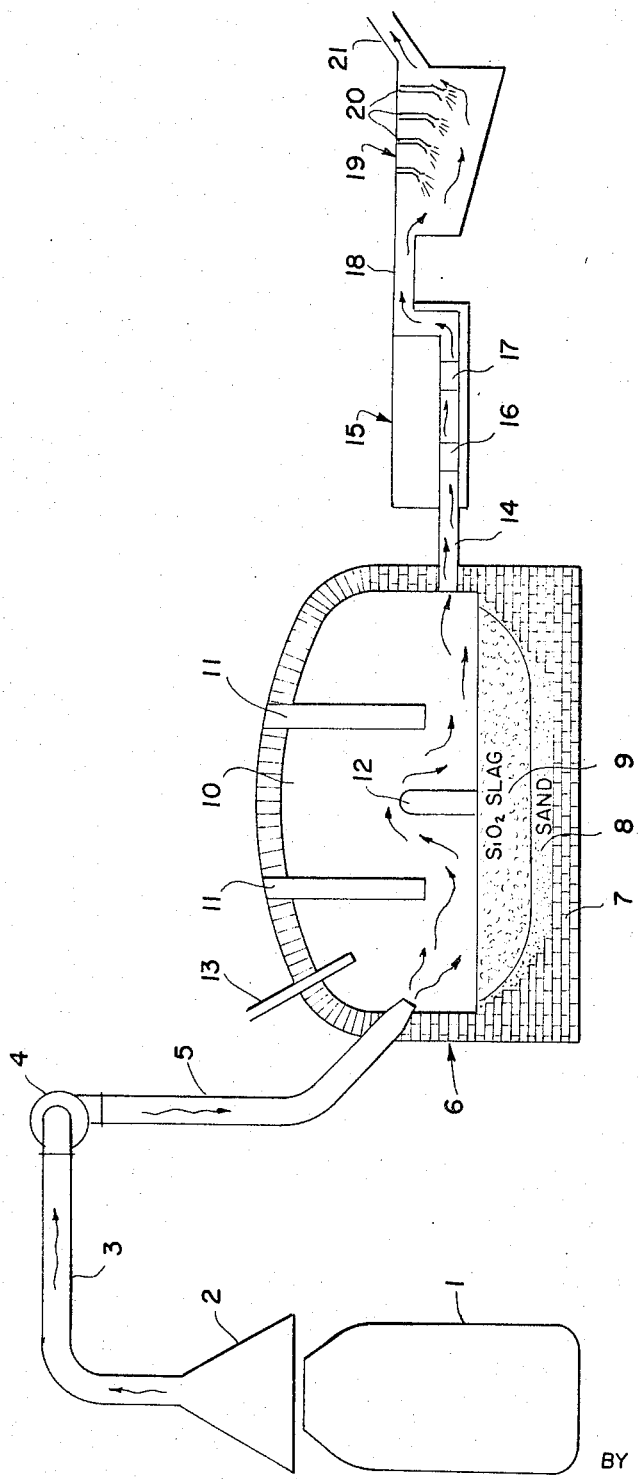

3,365,340
METHOD OF REMOVING IRON OXIDE
PARTICLES FROM FUMES
Norman F. Tisdale, 1408 Navahoe Drive,
Pittsburgh, Pa. 15228
Filed Jan. 20, 1964, Ser. No. 338,865
8 Claims. (Cl. 75—25)

The present invention relates to a novel process for the economical recovery of iron oxide particles suspended in fumes produced in the melting, refining and production of steel, sintering of ores, or blast furnace operations. It also relates to the recovery of iron from iron oxide scale, produced in the heating operation of iron and steel production. The oxygen type furnace, which is being widely adopted, is a producer of copious iron oxide fumes. The open hearth furnace, with or without the oxygen lance, also produces these iron oxide laden fumes. Several other melting and refining processes all produce similar fumes.

Communities which have grown up around such melting plants have suddenly enacted laws to force the reduction of these fumes and their solids from going into the air because of their adverse effect on health. Since there is approximately 1½% of the charge volatized into the air as iron oxide during the melting operation, this becomes a substantial economic loss unless recovered and a large amount of iron oxide is put into the atmosphere.

Present methods to recapture the particles from these fumes require high initial expense, substantial operating cost and an elaborate cooling system to cool the fumes. There are several methods which are used singly or in combination, in an attempt to do an efficient job.

All of the new basic oxygen furnaces come equipped with dust precipitators which are essentially water scrubbers, electrostatic precipitators and bag houses. This kind of equipment costs from 18% to 25% of the total cost of installing the oxygen furnace installation, whereas my system will cost only 6% to 12% of the total cost.

The system of the present invention essentially is to take the fumes and have them impinge in a heated liquid bath of silica slag which has been altered just a small amount by materials to make it more fluid. The furnace is so constructed that there may be one or more baffles along its length with the result of forcing impingement of the gas on the surface of the slag. This can be augmented by pressure or by a pump to force this material to hit the slag.

First of all, this slag must be kept at a high enough temperature that it will be fluid and that it will react chemically very quickly to absorb the iron oxide in the fumes. This temperature can be something between 2400° and 2900° F. but certainly preferably above 2600° F. To test this process, a hood is placed over the furnace and the fumes are sucked into this hood and are then drawn into a pipe and onto the precipitator. The temperature of the fumes as they leave the furnace is in excess of 2000° F., but cools when air comes into the system and then heats again as the CO in the gas burns to $CO_2$ so that the net result is that the gases may continue on their way at a temperature of approprixately 2000° F.

In the prior process that has been used, it is then subjected to water scrubbers, first, to cool it down and, secondly, to eliminate some of the heavier particles. The material is then put through an electro-static precipitator which forces the particles to drop and the gases go on to either another scrubber or bag house or a combination of both.

What I propose to do after the fumes have been collected, is to place into the system an air furnace, of the type that is used for the manufacture of steel rolls. This is a shallow bath and may be any width or length depending on the amount of iron oxide present ind the rate of gas flow. This type of furnace is fired from one end only and thus the direction of the gas is always in one direction. A scrubber is not used first because a high temperature is desired and the result is that the air furnace is kept constantly under temperature.

It has been found that iron oxide is highly soluble in a $SiO_2$ slag and of course it can be made more soluble by keeping the temperature high. In the dust that has been collected from these fumes it appears that there is about 90% $Fe_2O_3$ and FeO so that it is possible to collect a large amount of the iron that escapes from the furnace.

Tests indicate that the fumes after leaving the furnaces, heretofore mentioned, will be from 1200° F. to as high as 2000° F. and also that leaving open hearth checkers may be from 1100° F. to 1400° F. Therefore, an object of this invention is to effectively utilize this heat. Since a second heating unit is desired to keep fresh slag available, the waste heat may be directed towards preliminary heating of this slag material. It may also be directed towards a waste heat boiler.

Literature published from time to time, with particular reference to $SiO_2$ FeO and $Fe_2O_3$, clearly indicates by phase diagrams that iron oxide is highly soluble up to 55% in $SiO_2$. Using this information I have conceived a novel plan to direct the fumes from the melting operations, previously mentioned, to a prepared liquid slag whose main ingredient is $SiO_2$. Some modification may be made in the slag composition to obtain lower melting point slag. These materials are well known and fall in the alkaline earth group or rare earth as slats. They may be used singly or in combination, or they may be associated with rare earth salts which again may be used by themselves singly.

A further object of the present invention, therefore, is to direct the fumes at the liquid surface of the slag. The fumes may also be blown through, as in a Bessemer furnace.

Other objects and advantages will become more apparent from the study of the following description taken with the accompanying drawing wherein:

The single figure is a schematic diagram illustrating a preferred process embodying the present invention.

Referring more particularly to the drawing, numeral 1 denotes a furnace, such as for example, a basic oxygen furnace which emits fumes containing iron oxide, which fumes are directed into a hood 2 and through a duct 3. A pump 4 may be provided between ducts 3 and 5 to increase the velocity of flow of the fumes as they impinge the $SiO_2$ slag denoted by numeral 9 contained within an acid air furnace 6, which slag rests upon a bed of sand 8 contained within the basic brick work 7 of the furnace. Fuel is introduced through tube 13 into the furnace. Preferably one or more baffles such as 11 are provided to more effectively deflect the fumes onto the slag and thus prevent the fumes from by-passing the slag and going directly through the furnace. A sand separator 12 may also be used, if desired, which acts similarly to baffles 11.

As shown by the arrows, after the fumes impinge on slag 9 they flow through ducts 14, 16 and 17 in a waste heat chamber 15 and thence through duct 18 into a spray chamber 19 where a plurality of sprays 20 will cool the fumes and clean them of the last traces of dust contained therein before passing through exit 21 into the air.

When the iron oxide content of the iron oxide-slag mixture begins to reach full solubility, or at any point which practice determines is the cut-off point, the furnace is partially tapped. The procedure can be adapted or best suited to the plant equipment available.

For instance, since the time between tap and charge can be as low as 8 minutes, quick charges must be effected, or if two or more furnaces are hooked up in the circuit, a modification may be used. Some of these variations are as follows:

(1) When the slag approaches 40–50% FeO, the whole furnace is dumped and a new low iron oxide slag is charged.

(2) The slag may reach 40–50% FeO and half the charge is dumped, the furnace then is replenished with new slag and the system keeps running.

(3) The furnace can be so designed on an angle for instance where high FeO slag can be tapped at one end (usually opposite the dust entrance) and new liquid slag run in at the other end.

When the slag is cooled to a solid state, it can then be broken to desired size, and used as a burden in the blast furnace. This eliminates briquetting, special storage, special handling, etc. This provides a suitable method to recover the FeO.

The system design allows for variation to fit particular needs, also it permits economies according to the desired flow sheet.

When the fumes are brought along and then directed to the molten slag, there will be a gradual build-up with the result that something must be done about keeping the furnace slag active and to constantly absorb the iron and fumes. This then develops into a problem which must be peculiar to each particular plant, because there are three steps now open to pursue.

The first method is to allow the iron oxide content of the slag to run up until it is about 45% and then the whole slag is tapped from the furnace. Since the time available is short, this must be carried on rapidly and the replenishing slag must be heated in an auxiliary furnace that may be added to the air furnace in a short length of time. Secondly, a second method might be used in that the slag can be tapped when it approaches 45% or less and new slag can be put into one end of the furnace and the slag tapped, particularly at the other end to maintain a level of slag which will absorb the iron oxide rapidly. Finally, a third method can be evolved whereby the furnace is continuously tapped from one end and a new material constantly added to the other end so as to always get in new slag that can readily absorb the fumes and solids as they come into the system.

It should be noted here that the resultant product, since it will contain more than 40% iron, that is, $Fe_2O_3$ and FeO, can be used directly after crushing into the blast furnace where the iron may be recovered. The fumes leave the furnace. It is then possible to cool them. This may be done by water sprays which will not only carry the particles down but will cool the temperature of the gases so they may be put out into the air at a low temperature. Again, it is quite possible that the heat of these fumes may be used for heating a boiler which can be used for purposes within the plant.

As in the other systems, there will be necessary a certain amount of duct work and this, although not as great as in the electro-static process, is part of the cost of installing this equipment. The air furnace may be built high enough so that the fumes can go directly into the furnace. In other words, it can be raised in the air and so located that high pumping rates may not be necessary, but in the case of the open hearth which have oxygen lances, after the gases leave the checkers it will be noted that they lead into a collection pipe and this collection pipe then goes into a stack. The idea here then would be to build the furnace to absorb the fumes and the solids in such a manner that the fumes would leave the combined furnaces and go direct to the air furnace before proceeding to a stack and would likely be preceded before the stack by having a water spray to cool it down and to cleanse the last particles of dust from the fumes. The main cost of this invention would be the furnace itself which is a low cost furnace since it does not have any regenerative brickwork, and as a result its installation is simple and its cost is not very high. The advantages of this system comprise its simplicity as well as its low cost because it is believed that this will not cost 25% of that of the present systems and therefore would constitute a considerable savings.

In the case of open hearths, it is quite conceivable that the exit gases from the checkers could be put together involving two or more furnaces.

This system would be at ground level and quite easily manipulated to accommodate any number of furnaces.

The design of the slag furnaces is built around the oxide produced. Since the specific weight of the pregnant slag is figured at 2.6 it is ⅓ that of liquid steel so that a 30-ton steel air furnace would produce only a 10 ton iron oxide slag. It can be seen that if a 100-ton furnace is used, it would produce 1½ tons of FeO. Using a 10-ton slag furnace, it would absorb 4 charges requiring 4 hours. A secondary furnace is necessary then to have available 5 tons of slag every four hours.

After collecting the FeO from the melting fumes in the silica slag a modification is recommended for handling the recovered FeO.

The furnace design can be slightly altered and made deeper. Pig iron, either melted or solid, is placed in the furnace, melts and goes to the bottom. On top of this, a layer of silica is located, this to entrap the FeO.

Assume then the pig iron has a carbon content of approximately 4% and that some manganese is present, also, some silicon. A particle of FeO is in the slag, either combined as $FeOSiO_2$ or in suspension. Due to agitation or migration, it comes to the slag metal interface. There it meets carbon. The reaction is $$FeO:SiO_2+C=Fe+CO+SiO_2$$

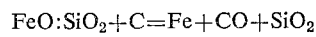

The Fe joins the metal, the C goes off as a gas, and the $SiO_2$ joins the slag. This process goes on ad infinitum so long as carbon is available and there is enough temperature to keep the iron and slag liquid.

As the iron volume increases, the carbon content goes down in the metal. So long as there is carbon available, the reduction of Fe goes on, however, the more carbon present, the greater the action causing slag agitation, which is desirable to entrap FeO.

Practice would dictate the addition of pig iron or injection of carbon from time to time to keep carbon high. When the metal volume increases sufficiently, it may be tapped into a mould or ladle and returned to an (a) open hearth furnace (b) holding ladle or (c) pig machine. This would make excellent charge material and, at the same time, solve the problem of using the recovered FeO.

The oxidation of the Si in the pig iron means a slow increase in the $SiO_2$ and eventually cause a necessity to remove some of it.

The advantages of this method are as follows:

(1) It provides low cost charge material for remelt.

(2) Pig iron, usually made by the steel company, is not lost, but only temporarily borrowed and returned to the system.

(3) The furnace is an acid construction.

(4) No additional silica is needed.

(5) The furnace must be run at least at melting temperature for iron.

(6) All manganese is recovered.

(7) There is very little supervision needed.

It should be noted that while I have referred to pig iron above, any other ferrous material, that is, any other iron-carbon combination, such as ordinary steel, may be used instead in the process described.

By the use of the acid furnace and incorporating with it the maintaining of a bath of liquid slag and ferrous material, the simplest form for both the recovery of the iron oxide and disposal of it is obtained. The only material to be used is carbon which can be replenished by either more pig iron or by carbon injection. Fuel must be supplied and this plus maintenance are the chief costs of operation. Since the furnace is not connected to checkers, a stand-by unit may be constructed so that it could be put in place by crane movement and thus prevent anything but a short shut-down.

The reaction of the C-FeO happens very fast and it has been demonstrated in acid steel making that the addition of 3000 lbs. of FeO to the slag causes the reaction to be completed in 2 minutes. This is usually accomplished with a bath with less than 1% carbon, so that with high carbon, such as contained in melted pig iron, the reaction would be completed with greater activity and in a shorter period of time.

The slag metal process offers a simple, complete system to separate iron oxide particles from the fumes and to make effective use of such particles, all with a minimum of attention.

Where waste heat boilers are used, no trouble is encountered by the tubes filling or clogging with an iron oxide coating as occurs in present systems.

Zinc is not absorbed in the present invention, because zinc is not reduced by carbon when in slag. Therefore, zinc is effectively eliminated as a contaminant, thus providing an improvement over present systems wherein zinc is retained.

Thus it will be seen that the present invention povides an efficient method to absorb the iron oxide from the fumes produced by melting ferrous materials or from the fumes produced by sintering iron oxide ores, etc.; a method to absorb the fumes produced by producing pig iron in a blast furnace; a method to take the scale produced from reheating or rolling mill operations and form an iron oxide silicate which may be charged into the blast furnace with simple preparation and handling; a method to utilize the iron oxide as charge material for a blast furnace by cooling the iron oxide silica slag and charging it as part of the blast furnace burden; and a method to absorb iron oxide particles found in fumes produced in steel melting processes, this to be irrespective of the type of steel made such as killed, rimmed or semi-killed.

While I have illustrated and described several embodiments of my invention, it will be understood that these are by way of illustration only, and that various changes and modifications may be made within the contemplation of my invention and within the scope of the following claims.

I claim:

1. In a process resulting in the formation of fumes in which iron oxide particles are suspended, the method of rapidly removing said particles comprising passing said fumes over while directing the particles into a substantial body of molten acid silica slag whose main ingredient is silica so as to form iron oxide silicate.

2. The method recited in claim 1 wherein the iron oxide is recovered by tapping the iron-pregnant slag into a container, allowing it to solidify, breaking up the solidified mass into particles which are returned to a blast furnace charge, whereby the iron is recovered from the slag.

3. The method recited in claim 1 wherein said silica slag is introduced into a furnace of acid construction to form a layer on top of a body of molten pig iron in said furnace to form the reaction $C + FeSiO_2 = CO + SiO_2 + Fe$, whereby the iron joins with the melted pig iron, which is finally tapped and returned to the metal producing system.

4. In a steel making furnace which produces fumes containing iron oxide particles in suspension, the method of rapidly removing said particles from the fumes, comprising directing said fumes into a furnace containing a molten body whose main ingredient is $SiO_2$, applying heat to said body while said fumes are passed over and directed into said body to bring it to between 2400° and 2900° F. so as to make the body molten and form $FeOSiO_2$.

5. The method recited in claim 4 wherein said $FeOSiO_2$ is tapped into a container, allowed to solidify, and is finally broken up and returned as a furnace charge material.

6. The method recited in claim 4 wherein said $SiO_2$ is introduced in an acid furnace used as an iron melting furnace by placing the $FeOSiO_2$ over a layer of molten ferrous material to form the reaction $$C + FeOSiO_2 = CO + SiO_2 + Fe$$

whereby the iron joins with the melted ferrous material.

7. The method recited in claim 6 wherein said molten ferrous material is pig iron.

8. In combination with a steel making furnace which produces fumes containing iron oxide particles, a hood over said furnace for collecting fumes laden with iron oxide particles, an air furnace adapted to contain a body of molten acid $SiO_2$ slag, duct means including fluid circulating means connecting said hood to said air furnace, a burner for maintaining said slag in molten condition, a pair of baffles extending downwardly from the roof of said air furnace to direct said fumes into said body of molten $SiO_2$ slag to cause a chemical reaction to form $FeOSiO_2$, and a scrubber connected to an outlet of said air furnace to remove remaining traces of iron oxide particles.

References Cited

UNITED STATES PATENTS

| | | | |
|---|---|---|---|
| 606,670 | 7/1898 | Jones et al. | 266—17 X |
| 723,105 | 3/1903 | Williams | 75—25 |
| 846,818 | 3/1907 | Baggaley | 75—25 |
| 897,993 | 9/1908 | McKenzie | 75—25 X |
| 2,540,593 | 2/1951 | Ogorzaly | 75—43 |
| 2,811,435 | 10/1957 | Bannister et al. | 75—60 X |
| 3,038,795 | 6/1962 | Rummel | 75—40 |
| 3,231,369 | 1/1966 | Gorlich et al. | 75—60 |

FOREIGN PATENTS 643,530    4/1927    France.

DAVID L. RECK, Primary Examiner.

HYLAND BIZOT, Examiner.

H. W. TARRING, Assistant Examiner.